March 17, 1953        E. D. HILL        2,631,358
INK CARRIER AND METHOD OF MAKING
Filed March 25, 1948
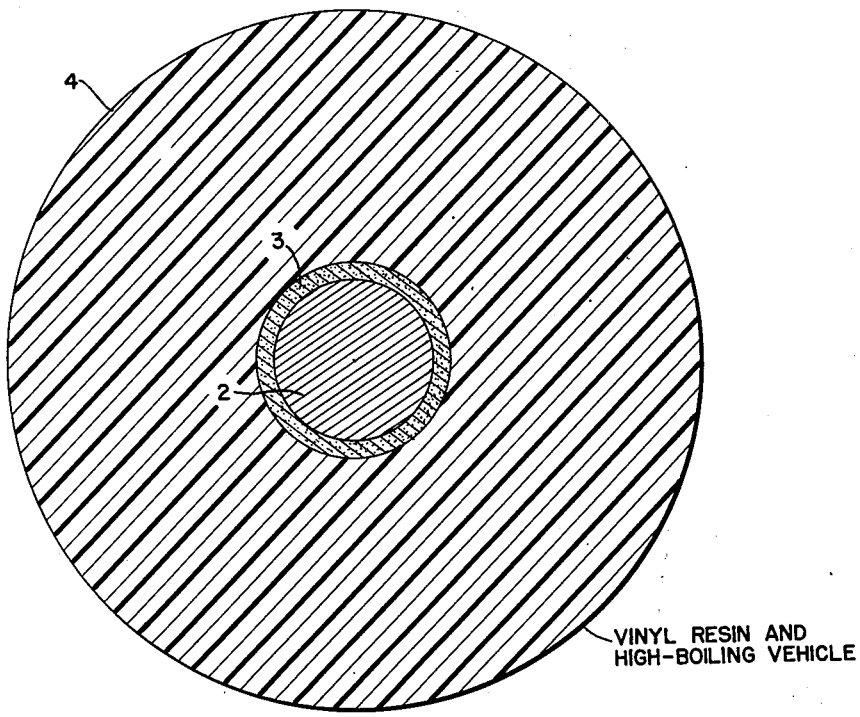
INVENTOR
EDWARD D. HILL
BY *Oberlin & Limbach*
ATTORNEYS Patented Mar. 17, 1953

2,631,358

UNITED STATES PATENT OFFICE 2,631,358

INK CARRIER AND METHOD OF MAKING

Edward D. Hill, Cleveland, Ohio

Application March 25, 1948, Serial No. 17,119

10 Claims. (Cl. 29—130)

1

Customarily, inking rollers for printing and graining have been made of a glue composition, glue modified by glycerin or like-acting agent. Although many efforts have been made from time to time to produce rollers of other substances, the glue-base roller has remained the standard, and substitute materials have had little practical application. The primary reason for this is that although the glue-base roller has certain disadvantages of vulnerability to atmospheric conditions and to action of ingredients of the inks, its great outstanding advantage of a peculiarly favorable body consistency has enabled it to maintain its supremacy in general. The gel structure of the glue provides a softness and resilience which enables the roller surface to operate satisfactorily on widely different structures of printing plates and the like. With the aforementioned disadvantages of susceptibility to atmospheric changes and detrimental action of ink ingredients, there is also a further disadvantage of an undesirably short length of working life. I have now found that ink carriers or rollers can be produced to have body consistency characteristics like that of the glue-base roller, but excelling it, and at the same time providing immunity to changes from atmospheric moisture and temperature variation, and immunity to detriment from oils and solvent ingredients in inks. When it is realized that a glue-base roller in the course of operation in the summer season in the temperate zone may encounter atmospheric humidity variations ranging from very high to very low, such as to occasion variation in roller diameter of 10 to 20 per cent or more and even cause jamming and tearing, the importance of a construction overcoming this defect is apparent. In relatively dry atmospheric conditions also, a roller which will not become correspondingly undesirably stiffened is also seen to be an important advance. When there is added to this the further factor of resistance to detriment by ink constituents, while a uniformly soft and resilient body consistency is maintained, the practical advantage of such ink carrier construction is particularly important. Thus, in accordance with the present invention, ink carrier or roller construction may be had which presents these superiorities over the customary glue-base construction.

To the accomplishment of the foregoing and related ends, the invention, then, comprises the features hereinafter fully described and particularly pointed out in the claims, the following description and the annexed drawing setting forth in detail certain illustrative embodiments

2 of the invention, these being indicative, however, of but a few of the various ways in which the principle of the invention may be employed.

In said annexed drawing:

The sole figure is a transverse section of an illustrative embodiment of the invention.

For the production of ink carriers or rollers in accordance with the present invention, a high-boiling plasticizer or vehicle, desirably a high boiling inert ester, is thickened up with a polyvinyl synthetic resin. Such polyvinyl resin materials are of polyvinyl ester character, polyvinyl chloride, polyvinyl acetate, polyvinyl copolymers thereof, and copolymers including vinylidene, etc. This type of resin is known to some extent in the waterproofing industry, such as for making waterproof garments, tissues, etc. As aforenoted, the polyvinyl synthetic resins as formable by known chemical procedure as described in the literature are applicable. The high-boiling vehicle which is employed as a liquid at the thickening temperature as the polyvinyl synthetic resin is incorporated is non-fugitive at 250–350° F., and may be, for instance, a high-boiling phthalate, dibutyl phthalate, dioctyl phthalate, dihexyl phthalate, dibutoxyethyl phthalate, diethoxy phthalate, dicarbitol phthalate, also other liquids which are miscible, such as triglycol dihexoate, tricresyl phosphate, dibutyl sebacate, etc. Particularly desirable are dioctyl phthalate and dihexyl phthalate.

To form a roller on a metal mandrel or shaft 2, the latter is first coated with a suitable adhesive 3. Such may be e. g. polyvinyl chloride resin thinned with an extender, and polyvinyl acetate similarly thinned, applied at raised temperature. While the coating on the shaft is still wet, the material for the roller body 4 is applied. This is made up by heating the high-boiling vehicle or extender, for example, dioctyl phthalate, and stirring in a minor proportion of the polyvinyl chloride resin. Thus, with a kettle temperature above 250° F., and preferably around 300–312° F., about 35 per cent of the resin is thickened into the liquid. Depending upon the particular operating conditions to be encountered, the amount of resin thickened into the liquid may be 20 to nearly 50 per cent. The larger amounts of resin produce a roller body which is somewhat stiffer. When the resin solution comes to its maximum temperature as indicated and is in uniform condition, it may be allowed to stand at such temperature for a few minutes, an may then be poured in on the coated shaft in any suitable mold. Desirably, the liquid is forced in by a bottom draw-off from the kettle apparatus, and the mold may have a stream-heated jacket. In general, the technique of pouring the resin onto the shaft is similar to the practice with glue-base compositions. In the preparation of the resin material, it is important that the temperature be sufficiently high to thoroughly incorporate the resin in the high-boiling liquid. In general, this requires a temperature at least around 250° F., and it is important on the other hand that the temperature should not be too high. For instance, if the temperature should be as high as around 350° F., a detrimental action on the resin occurs, and it will lack the body consistency otherwise characteristic of the present material.

On cooling and return to ordinary temperature the molded material solidifies to a resilient gel body.

Ink carriers or rollers of various character and dimensions may thus be formed, and such construction provides a resilient body of even character and uniformity, the resilience being superior to that commonly had in glue-base rollers, and the working life being greater. Irrespective of variations in atmospheric humidity and temperature, the present material preserves its uniformity of dimension and operation, and it is particularly resistant to the oils and solvents occurring in inks. In contrast to heretofore known glue roller substitutes, waste rollers can be re-molded.

Other modes of applying the principle of the invention may be employed, change being made as regards the detail described, provided the features stated in any of the following claims, or the equivalent of such, be employed.

I therefore particularly point out and distinctly claim as my invention:

1. An ink carrier, comprising a rigid metal shaft, an adhesive coating on said shaft, and a soft body adhered to said adhesive, said body being formed of about 65 per cent dioctyl phthalate thickened with about 35 per cent of polyvinyl chloride resin.

2. An ink carrier, comprising a rigid metal shaft, an adhesive coating on said shaft, and a soft body adhered to said adhesive, said body being formed of 65 per cent to 80 per cent of a phthalate non-fugitive at 250–350° F. thickened with 20–35 per cent of polyvinyl chloride resin.

3. An ink carrier, comprising a rigid metal shaft, an adhesive coating on said shaft, and a soft body adhered to said adhesive, said body being formed of 65–80 per cent of a phthalate non-fugitive at 250–350° F. thickened with 20–35 per cent of a polyvinyl synthetic resin.

4. An ink carrier, comprising a rigid metal shaft, an adhesive coating on said shaft, and a soft body adhered to said adhesive, said body being formed of 65–80 per cent of an ester non-fugitive at 250–350° F. thickened with 20–35 per cent of polyvinyl synthetic resin.

5. An ink carrier, comprising a rigid metal shaft, and an adhesive coating on said shaft, and a soft body adhered to said adhesive, said body being formed of 65–80 per cent of a high-boiling vehicle non-fugitive at 250–350° F. thickened with 20–35 per cent of a polyvinyl synthetic resin.

6. In a process of the character described, making an ink-carrying roller by coating a metal shaft with a polyvinyl resin adhesive, heating a mixture of dioctyl phthalate in major amount and a minor amount of polyvinyl chloride resin to around 300° F., and molding the mixture by flowing the hot liquid onto the adhesive coating on the metal shaft and solidifying the liquid by return to ordinary temperature.

7. In a process of the character described, making an ink-carrying roller by coating a metal shaft with an adhesive, heating a mixture of a major amount of an ester non-fugitive at 250–350° F. and a minor amount of polyvinyl synthetic resin to around 300° F., and molding the mixture by flowing the hot liquid onto the adhesive coating on the shaft and solidifying the liquid by return to ordinary temperature.

8. In a process of the character described, making an ink-carrying roller by coating a metal shaft with an adhesive, heating a liquid non-fugitive at 250–350° F., thickening the same with a minor amount of a polyvinyl synthetic resin, and molding the mixture by flowing the hot liquid onto the adhesive coating on the metal shaft while said adhesive is still wet and solidifying the liquid by return to ordinary temperature.

9. In a process of the character described, making an ink carrier by heating about 65 per cent of an ester non-fugitive at 250–350° F., thickening the same by incorporating about 35 per cent of a polyvinyl synthetic resin, and molding the mixture by flowing the hot liquid into a mold cavity imparting ink carrier shape and solidifying the liquid by return to ordinary temperature.

10. In a process of the character described, making a soft ink carrying material by heating a major amount of a liquid non-fugitive at 250–350° F. to above 250° F., thickening the same with a minor amount of a polyvinyl synthetic resin, and molding to desired ink carrier shape in a mold cavity.

EDWARD D. HILL.

REFERENCES CITED

The following references are of record in the file of this patent:

UNITED STATES PATENTS

| Number | Name | Date |
|---|---|---|
| 48,453 | Sentell | June 27, 1865 |
| 1,600,841 | Neall | Sept. 21, 1926 |
| 1,870,661 | Vogt | Aug. 9, 1932 |
| 2,054,620 | Freedlander | Sept. 15, 1936 |
| 2,230,289 | Dodge | Feb. 4, 1941 |
| 2,312,853 | Toland | Mar. 2, 1943 |
| 2,329,796 | Stoffer | Sept. 21, 1943 |
| 2,349,412 | Douglas | May 23, 1944 |
| 2,349,413 | Hemperly | May 23, 1944 |
| 2,431,745 | Flanagan | Dec. 2, 1947 |